United States Patent
Li et al.

(10) Patent No.: US 11,442,566 B2
(45) Date of Patent: Sep. 13, 2022

(54) DISPLAY PANEL AND DISPLAY DEVICE

(71) Applicants: WUHAN TIANMA MICROELECTRONICS CO., LTD., Wuhan (CN); WUHAN TIANMA MICROELECTRONICS CO., LTD. SHANGHAI BRANCH, Shanghai (CN)

(72) Inventors: Zuhua Li, Shanghai (CN); Lijing Han, Shanghai (CN)

(73) Assignees: WUHAN TIANMA MICRO ELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 17/121,875

(22) Filed: Dec. 15, 2020

(65) Prior Publication Data
US 2021/0096680 A1    Apr. 1, 2021

(30) Foreign Application Priority Data
Sep. 18, 2020   (CN) .......................... 202010984249.6

(51) Int. Cl.
*G06F 3/044*   (2006.01)
*G06F 3/041*   (2006.01)

(52) U.S. Cl.
CPC .......... *G06F 3/0412* (2013.01); *G06F 3/0446* (2019.05); *G06F 2203/04111* (2013.01)

(58) Field of Classification Search
None
See application file for complete search history.

(56) References Cited

U.S. PATENT DOCUMENTS

2020/0133438 A1 *   4/2020   Kim ...................... G06F 3/0448

FOREIGN PATENT DOCUMENTS

| CN | 101739174 A | 6/2010 |
|---|---|---|
| CN | 102915155 B | 5/2016 |

* cited by examiner

*Primary Examiner* — Brian M Butcher
(74) *Attorney, Agent, or Firm* — Tarolli, Sundheim, Covell & Tummino LLP

(57) ABSTRACT

A display panel and a display device are provided. The display panel includes a touch unit. The touch unit includes first detection electrode groups arranged along a first direction, second detection electrode groups arranged along a second direction, and bridges including a first bridge. The first direction intersects the second direction. Each of the plurality of first detection electrode groups includes a first detection electrode sub-block and a second detection electrode sub-block that are adjacent to each other along the first direction. The first detection electrode sub-block includes a first main portion, and the second detection electrode sub-block includes a second main portion and a first branching portion. The first branching portion extends toward the first main portion, and the first bridge is configured to electrically connect the first branching portion and the first main portion.

17 Claims, 8 Drawing Sheets

DISPLAY PANEL AND DISPLAY DEVICE

CROSS-REFERENCE TO RELATED APPLICATIONS

The present disclosure claims priority to Chinese Patent Application No. 202010984249.6, filed on Sep. 18, 2020, the content of which is incorporated herein by reference in its entirety.

TECHNICAL FIELD

The present disclosure relates to the field of display technology, and more particularly, to a display panel and a display device.

BACKGROUND

In the display panel with a touch function, the touch electrodes separated from each other are electrically connected through bridges. As a dimension of the display panel increases and the display resolution increases, it makes the design of the bridge become more difficult. On the one hand, as the dimension of the display panel increases, the number of bridges increases; and on the other hand, as the display resolution increases, space for the bridges is becoming smaller.

The increase in the number of bridges will lead to more serious effect on blocking the pixels, which will cause visibility of the bridges and affect the display effect of the display panel. Therefore, for the display panel, how to decrease visibility of the bridges has increasingly become a very important topic in development of the display panel.

SUMMARY

In an aspect, an embodiment of the present disclosure provides a display panel. The display panel includes a touch unit. The touch unit includes a plurality of first detection electrode groups arranged along a first direction, a plurality of second detection electrode groups arranged along a second direction, and bridges including a first bridge. The first direction intersects the second direction, each of the plurality of first detection electrode groups includes a first detection electrode sub-block and a second detection electrode sub-block that are adjacent to each other along the first direction. The first detection electrode sub-block includes a first main portion, and the second detection electrode sub-block includes a second main portion and a first branching portion. The first branching portion extends toward the first main portion, and the first bridge is configured to electrically connect the first branching portion to the first main portion.

In another aspect, an embodiment of the present disclosure provides a display device including a display panel and a display module. The display panel includes a touch unit. The touch unit includes a plurality of first detection electrode groups arranged along a first direction, a plurality of second detection electrode groups arranged along a second direction, and bridges including a first bridge. The first direction intersects the second direction, each of the plurality of first detection electrode groups includes a first detection electrode sub-block and a second detection electrode sub-block that are adjacent to each other along the first direction. The first detection electrode sub-block includes a first main portion, and the second detection electrode sub-block includes a second main portion and a first branching portion. The first branching portion extends toward the first main portion, and the first bridge is configured to electrically connect the first branching portion to the first main portion. The display module includes a substrate, a driving circuit layer arranged on the substrate and including a plurality of thin film transistors, a light-emitting element layer arranged on the driving circuit layer, and an encapsulation film arranged on the light-emitting element layer. The light-emitting element layer includes a plurality of pixel electrodes that is connected to the plurality of thin film transistors. The touch unit is located at a side of the encapsulation film facing away from the substrate.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, and other drawings can also be acquired by those skilled in the art without paying creative efforts.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A alone, A and B, B alone. In addition, the character "/" herein generally indicates that the related objects before and after the character form an "or" relationship.

It should be understood that, although the detection electrode block may be described using the terms of "first", "second", "third", etc., in the embodiments of the present disclosure, the detection electrode block will not be limited to these terms. These terms are merely used to distinguish detection electrode blocks from one another. For example, without departing from the scope of the embodiments of the present disclosure, a first detection electrode block can also be referred to as a second detection electrode block, similarly, a second detection electrode block can also be referred to as a first detection electrode block.

Figure 1:
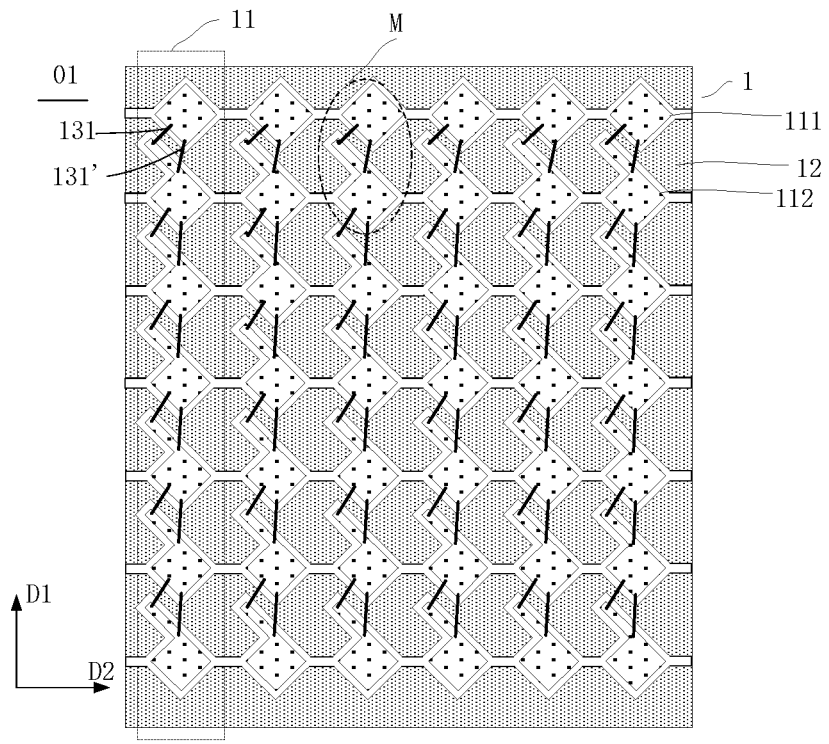
FIG. 1 is a schematic diagram of a display panel according to an embodiment of the present disclosure.
Figure 2:
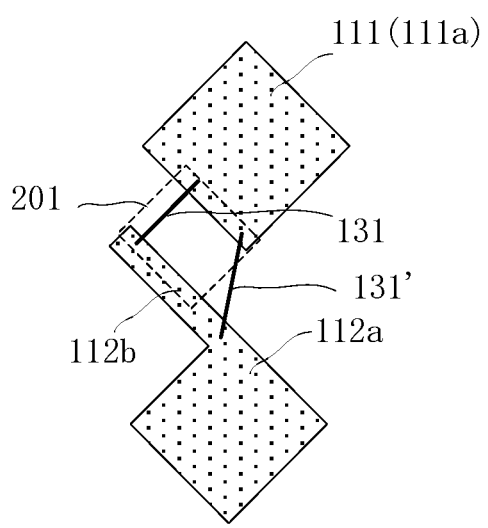
FIG. 2 is an enlarged view of a region M shown in FIG. 1.

FIG. 1 is a schematic diagram of a display panel according to an embodiment of the present disclosure, and FIG. 2 is an enlarged view of a region M shown in FIG. 1. As shown in FIG. 1 and FIG. 2, the display panel 01 includes a touch unit 1. The touch unit 1 includes a plurality of first detection electrode groups 11 arranged along a first direction D1, a plurality of second detection electrode groups 12 arranged along a second direction D2, and bridges 13 including a first bridge 131. The first direction D1 intersects the second direction D2. The first detection electrode group 11 includes a first detection electrode sub-block 111 and a second detection electrode sub-block 112 that are adjacent to each other along the first direction. The first detection electrode sub-block 111 includes a first main portion 111a, and the second detection electrode sub-block 112 includes a second main body 112a and a first branching portion 112b. The first branching portion 112b extends toward the first main portion 111a of the first detection electrode sub-block. The first bridge 131 is configured to electrically connect the first branching portion 112b and the first main body portion 111a of the first detection electrode sub-block.

As shown in FIG. 1, since the second detection electrode sub-block includes the first branching portion extending toward the first main portion of the first detection electrode sub-block, an adjacent area (as indicated by 201 in FIG. 2) between the first detection electrode sub-block and the second detection electrode sub-block is greatly increased, then the space for the bridges can be increased. Therefore, a distance between two bridges can be set larger, thereby reducing visibility of the bridges. In addition, the number of first bridges can be two or more. For example, the number of first bridges shown in FIG. 1 is two, that is, the first detection electrode sub-block and the second detection electrode sub-block can be electrically connected to each other through two or more bridges. The two-bridge design or a multi-bridge design can increase antistatic ability of the touch unit and enhances reliability of the display panel.

It should be noted here that the "adjacent" mentioned herein means that the two detection electrode blocks are very close to each other but not directly connected to each other.

The display panel can be a rigid display panel or a flexible display panel.

Among, one of the first detection electrode group 11 and the second detection electrode group 12 can be a driving electrode, and the other one thereof can be a sensing electrode.

One of the first direction D1 and the second direction D2 can be a width direction of the display panel, and the other one of the first direction D1 and the second direction D2 can be a length direction of the display panel.

Figure 3:
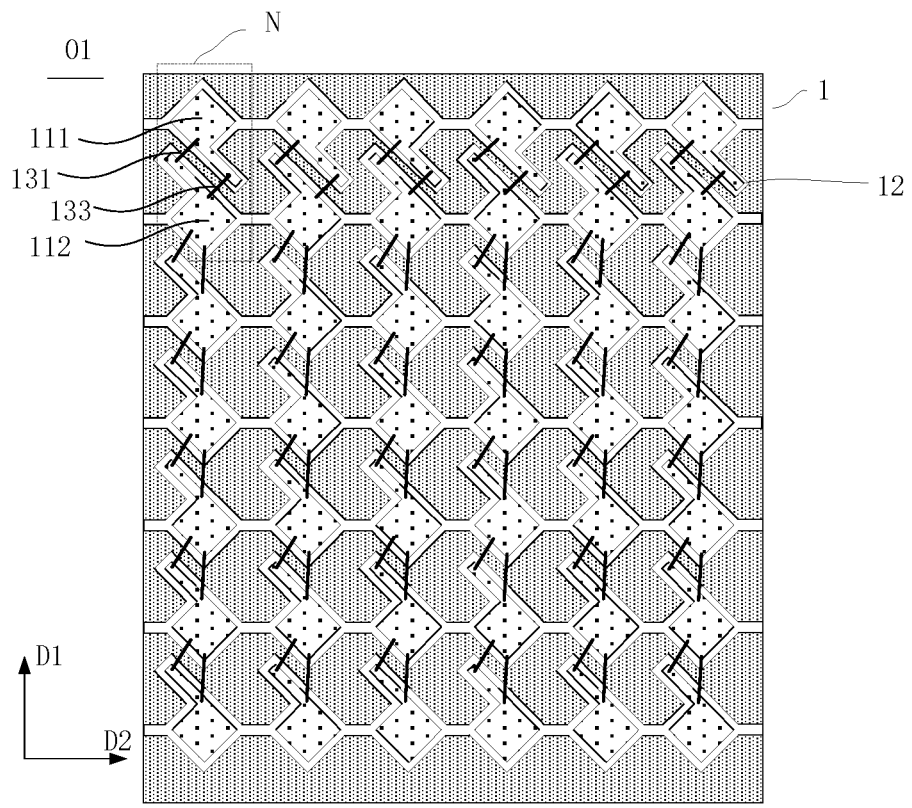
FIG. 3 is a schematic diagram of a display panel according to an embodiment of the present disclosure.
Figure 4:
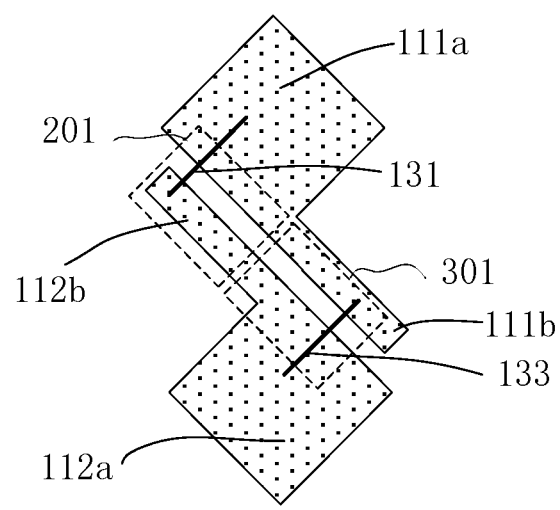
FIG. 4 is an enlarged view of a region N shown in FIG. 3.

In an embodiment, in order to increase the adjacent area between two adjacent detection electrode blocks and increase a distance between the two adjacent bridges, another design of the display panel as shown in FIG. 3 and FIG. 4 is proposed. The technical parts in this embodiment that are the same as those in the foregoing embodiment will not be repeated herein. The following will focus on the technical points of this embodiment. In this embodiment, as shown in FIG. 3, the first detection electrode sub-block 111 further includes a third branching portion 111b extending toward the second main portion 112a of the second detection electrode sub-block, and the bridges 13 further include a third bridge 133 configured to electrically connect the third branching portion 111b and the second main portion 112a of the second detection electrode sub-block.

As shown in FIG. 3, in addition to that the second detection electrode sub-block includes the first branching portion extending toward the first main portion of the first detection electrode sub-block, the first detection electrode sub-block further includes the third branching portion extending toward the second main portion of the second detection electrode sub-block, so that an adjacent area between the first detection electrode sub-block and the second detection electrode sub-block is increased, specifically, the adjacent area is increased from the area 201 shown in FIG. 2 to the area 201 and the area 301 shown in FIG. 4. Therefore, the space for the bridge is increased, and a distance between two bridges can be increased, thereby reducing visibility of the bridges. For example, as shown in FIG. 2, both the two bridges are provided on the first branching portion; and as shown in FIG. 4, one of the two bridges (for example the first bridge 131) is provided on the first branching portion, and the other one of the two bridges (for example the third bridge 133) is provided on the third branching portion. With reference to FIG. 1 and FIG. 3, it can be seen that the distance between two adjacent bridges (131 and 133) shown in FIG. 3 is much greater than the distance between two adjacent bridges (131 and 131') shown in FIG. 1. Therefore, the design shown in FIG. 3 can ameliorate visibility of the bridges.

Figure 5:
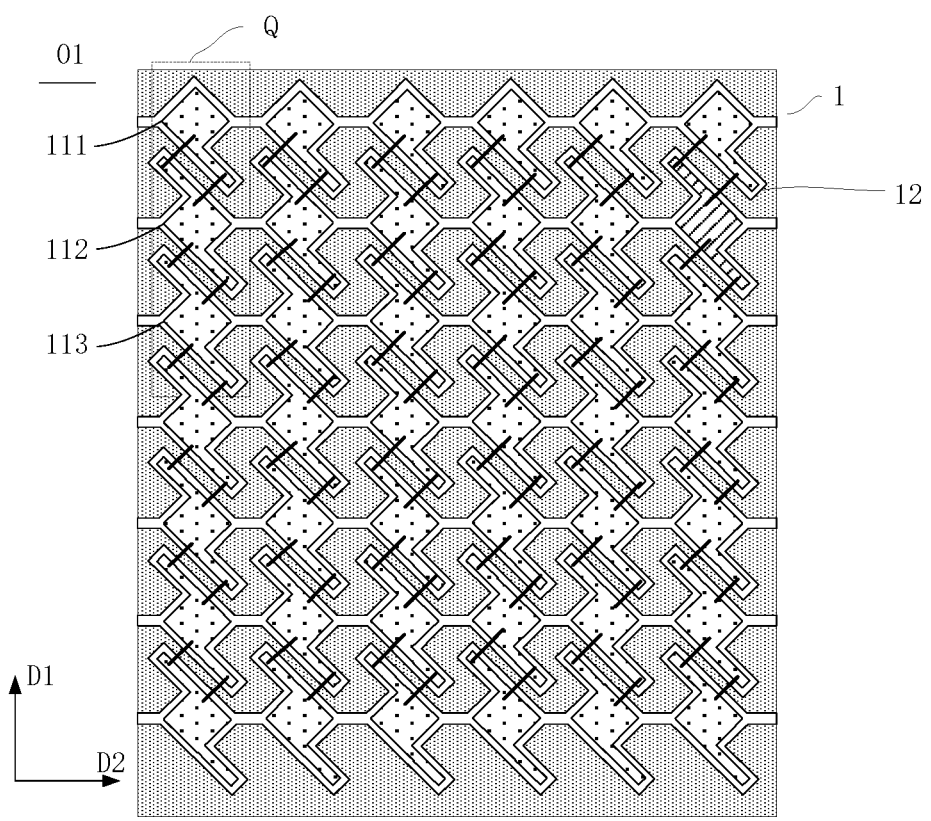
FIG. 5 is a schematic diagram of a display panel according to an embodiment of the present disclosure.
Figure 6:
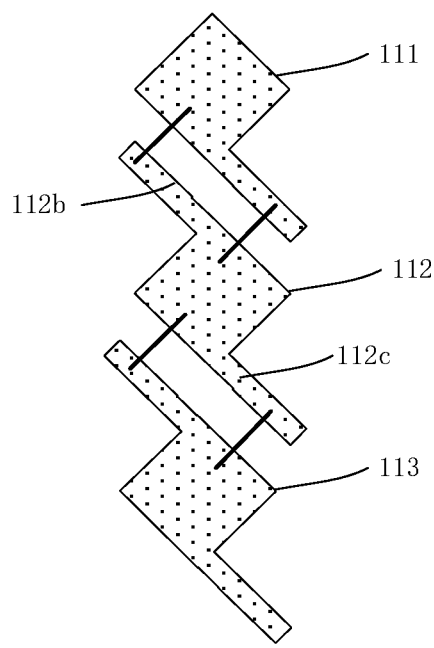
FIG. 6 is an enlarged view of a region Q shown in FIG. 5.

In order to increase an adjacent area between the second detection electrode sub-block and the third detection electrode sub-block adjacent thereto and located at another side of the second detection electrode sub-block, as shown in FIG. 5 and FIG. 6, an embodiment of the present disclosure provides a schematic diagram of a display panel. As shown in FIG. 5 an FIG. 6, the technical parts in this embodiment that are the same as those in the foregoing embodiments will not be repeated herein, and the following will focus on the technical main points of this embodiment. In this embodiment, as shown in FIG. 5, the first detection electrode group further includes a third detection electrode sub-block 113, the first detection electrode sub-block 111, the second detection electrode sub-block 112, and the third detection electrode sub-block 113 are adjacent to each other and sequentially arranged along the first direction D1. The third detection electrode sub-block 113 includes a third main portion 113a, the second detection electrode sub-block 112 further includes a second branching portion 112c, and the second branching portion 112c extends toward the third main portion 113a of the third detection electrode sub-block. The bridges 13 further include a second bridge 132 configure to electrically connect the second branching portion 112c o and the third main portion 113a.

As shown in FIG. 5, the second branching portion further includes the second branching portion extending toward the third main portion, so that the adjacent area between the second detection electrode sub-block and the third detection electrode sub-block is increased. Therefore, the space for the bridge configured to electrically connect the second detection electrode sub-block and the third detection electrode sub-block, is increased.

Figure 7:
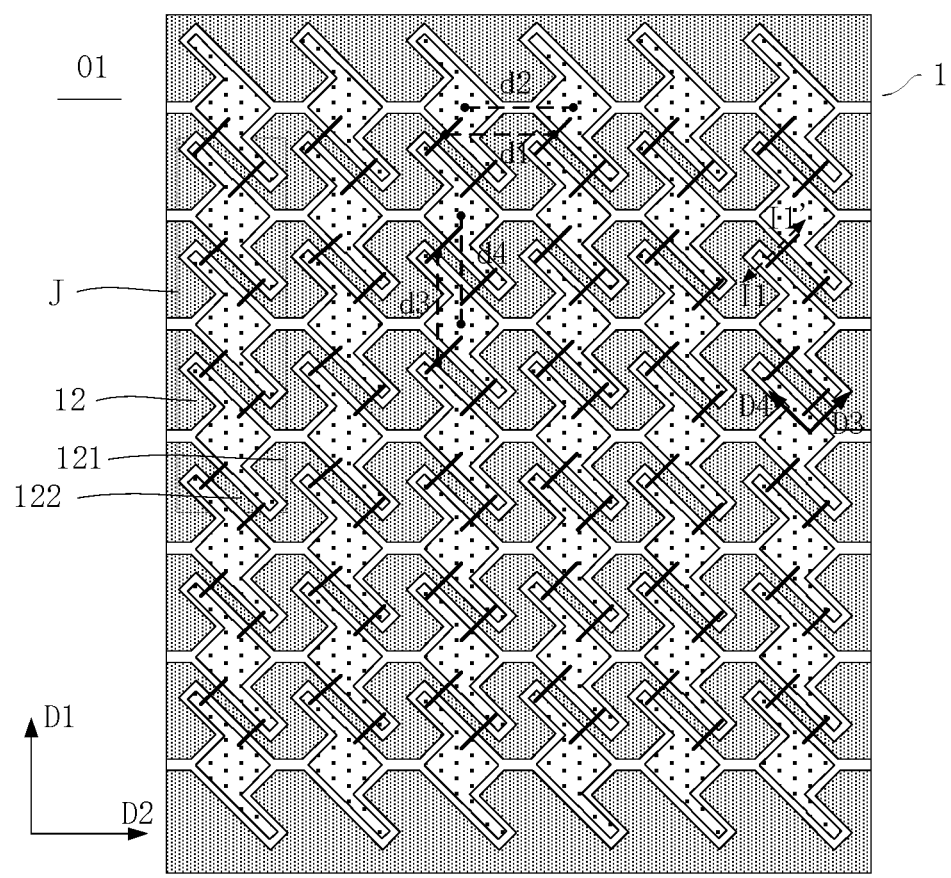
FIG. 7 is a schematic diagram of a display panel according to an embodiment of the present disclosure.
Figure 8:
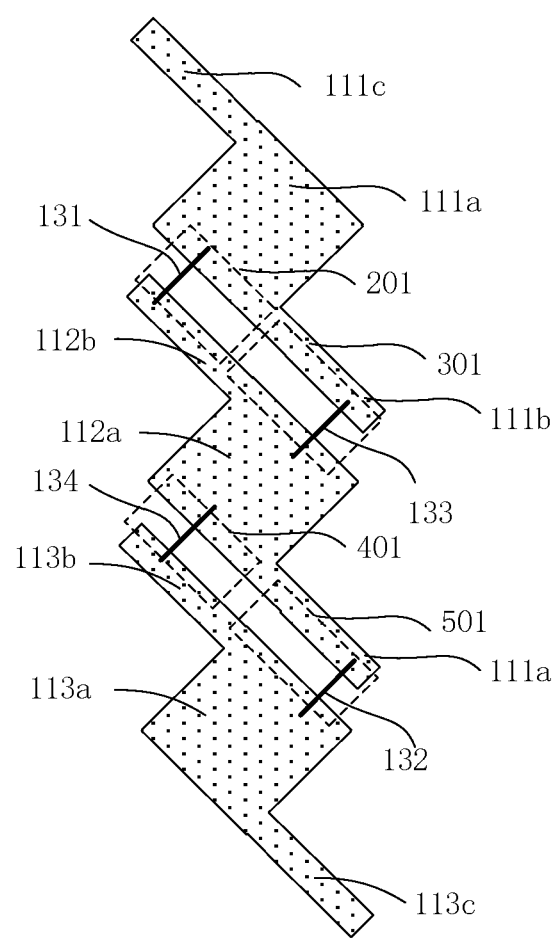
FIG. 8 is an enlarged view of a region J shown in FIG. 7.

In order to increase the adjacent area between two adjacent detection electrode sub-blocks of the display panel, as shown in FIG. 7 and FIG. 8, an embodiment of the present disclosure further provides a schematic diagram of the display panel. As shown in FIG. 7 an FIG. 8, the technical parts in this embodiment that are the same as those in the foregoing embodiments will not be repeated herein, and the following will focus on the technical main points of this embodiment. In this embodiment, as shown in FIG. 7, the first detection electrode sub-block, the second detection electrode sub-block, and the third detection electrode sub-block each have a structure of "main portion+two branching portions", and the adjacent area between two adjacent detection electrode sub-blocks includes two parts, so that the bridges that electrically connect the two adjacent detection electrode sub-blocks can be arranged on two branching portions, thereby increasing the distance between adjacent bridges and decreasing visibility of the bridges.

With reference to FIG. 8, the second detection electrode sub-block 112 includes a second main portion 112a, a first branching portion 112b and a second branching portion 112c, the first detection electrode sub-block 111 includes a first main portion 111a, a third branching portion 111b and a fifth branching portion 111c, and the third detection electrode sub-block 113 includes a third main portion 113a, a fourth branching portion 113b and a sixth branching portion 113c. The first branching portion 112b extends toward the first main portion 111a of the first detection electrode sub-block, the third branching portion 111b extends toward the second main portion 112a of the second detection electrode sub-block, and the second branching portion 112c extends toward the third main portion 113a of the third detection electrode sub-block. The adjacent area between every two adjacent sub-detection electrode blocks includes two adjacent parts. For example, the adjacent area between the first detection electrode sub-block 111 and the second detection electrode sub-block 112 includes an adjacent sub-area 201 between the first branching portion and the first detection electrode sub-block, and an adjacent sub-area 301 between the third branching portion and the second detection electrode sub-block, and the adjacent area between the second detection electrode sub-block 112 and the third detection electrode sub-block 113 includes an adjacent sub-area 401 between the second branching portion and the third detection electrode sub-block, and an adjacent area 501 between the fourth branching portion and the second detection electrode sub-block.

Since the adjacent area between every two adjacent detection electrode sub-blocks is larger, the space for the bridge is larger, and thus the distance between two adjacent bridges can be set to be larger. For example, the bridges that electrically connect the first detection electrode sub-block and the second detection electrode sub-block include the first bridge and the third bridge, and the bridges that electrically connect the second detection electrode sub-block and the third detection electrode sub-block include the second bridge and the fourth bridge. The first bridge is configured to electrically connect the first branching portion 112b and the first main portion 111a of the first detection electrode sub-block, the second bridge 132 is configured to electrically connect the second branching portion 112c of the second detection electrode sub-block and the third main portion 113a of the third detection electrode sub-block, and the third bridge 133 is configured to electrically connect the third branching portion 111b to the second main portion 112a of the second detection electrode sub-block. As shown in FIG. 7, the first bridge and the third bridge are respectively arranged on the first branching portion and the third branching portion, and the distance between the first bridge and the second bridge can be set to be quite large; the second bridge and the fourth bridge are respectively arranged on the second branching portion and the fourth branching portion, and the distance between the second bridge and the fourth bridge can be set to be quite large. Therefore, in order to increase an antistatic ability of every two adjacent detection electrode sub-blocks, they are connected through two bridges. Since the two bridges are respectively provided on different branching portions, the distance between the two bridges becomes larger, and visibility of the bridges is decreased.

In order to ensure touch uniformity of the display panel, the first detection electrode sub-block, the second detection electrode sub-block, and the third detection electrode sub-block can have a same structure.

In the present disclosure, the branching portion of the detection electrode sub-block can be set in various manners.

In an embodiment, as shown in FIG. 1 to FIG. 8, the branching portion can extend from an end of the side of the second main portion toward the main portion of an adjacent detection electrode block.

Figure 9:
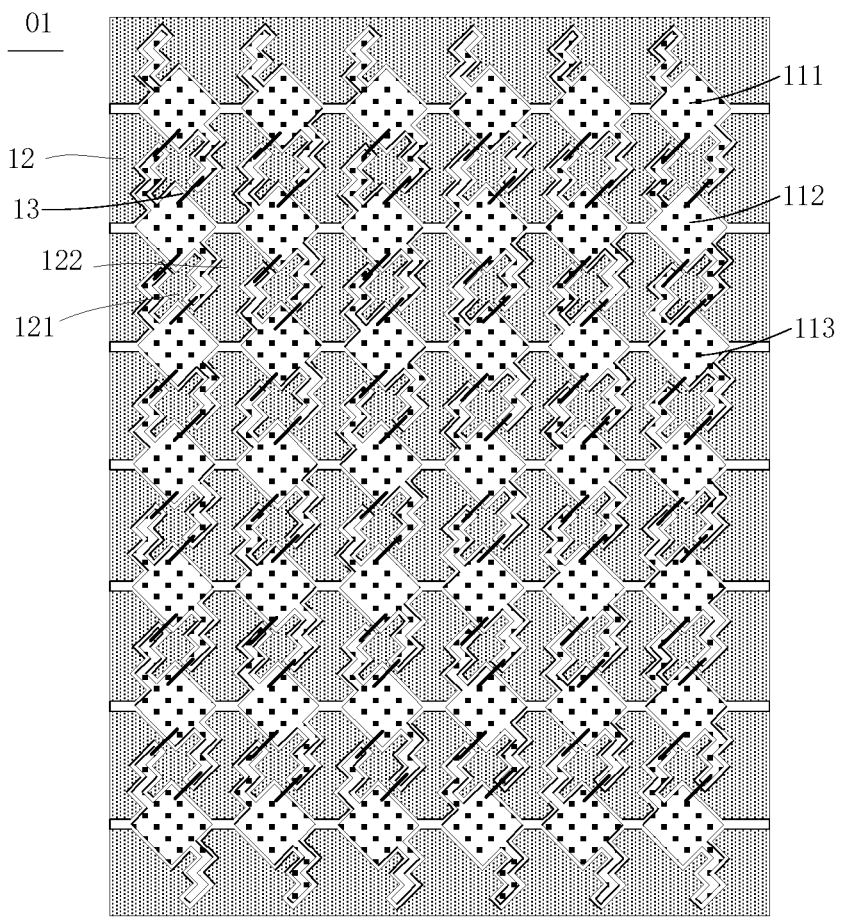
FIG. 9 is a schematic diagram of a display panel according to an embodiment of the present disclosure.

In an embodiment, as shown in FIG. 9, the branching portion can extend from a central part of the side of the second main portion toward the main portion of an adjacent detection electrode block.

Besides extending from the central part and the end of the side of the main portion, the branching portion can extends from other small part of the side of the main portion toward the main portion of an adjacent detection electrode block.

Figure 10:
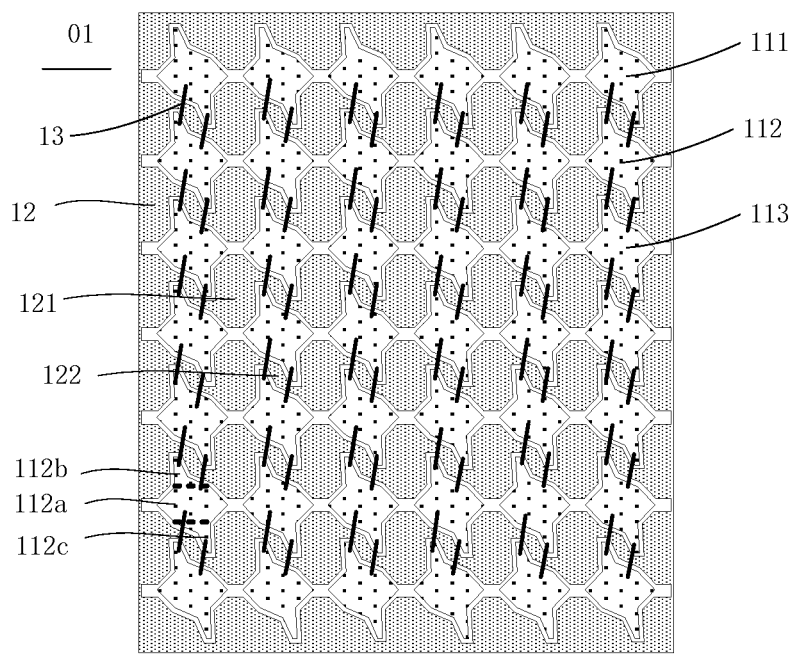
FIG. 10 is a schematic diagram of a display panel according to an embodiment of the present disclosure.
Figure 11:
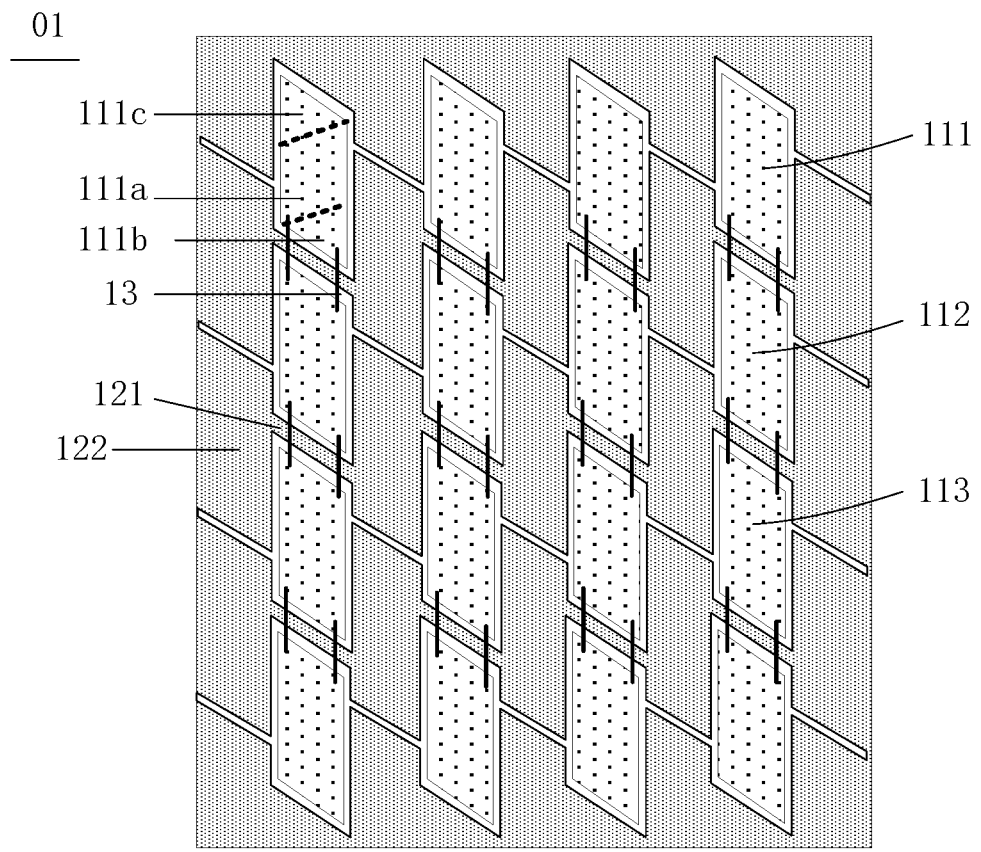
FIG. 11 is a schematic diagram of a display panel according to an embodiment of the present disclosure.

Besides extending a small part of the side of the main portion, the branching portion can also extend from a whole side of the second main portion toward the main portion of an adjacent detection electrode block. In other words, as shown in FIG. 10 and FIG. 11, a side of the second main portion of the second detection electrode sub-block is reused as a side of the branching portion. For example, as shown in FIG. 10, the second main portion 112a of the second detection electrode sub-block and the first branching portion 112b share a same side (as indicated by a dashed line), and the second main portion 112a of the second detection electrode sub-block and the second branching portion 112c share a same side (as indicated by a dashed line); as shown in FIG. 11, the first main portion 111a of the first detection electrode sub-block and the third branching portion 111b share a same side (as indicated by a dashed line), and the first main portion 111a of the first detection electrode sub-block and the fifth branching portion 111c share a same side (as indicated by a dashed line).

It should be noted that all manner for setting the branching portions made by those skilled in the art under an enlightenment of the concept of the present disclosure shall fall within a protection scope of the present disclosure.

In the present disclosure, the branching portion of the detection electrode sub-block can be set in various manners.

In an embodiment, as shown in FIG. 11, the branching portion has a triangular shape. In another embodiment, as shown in FIG. 7, the branching portion has a quadrangular shape.

Figure 12:
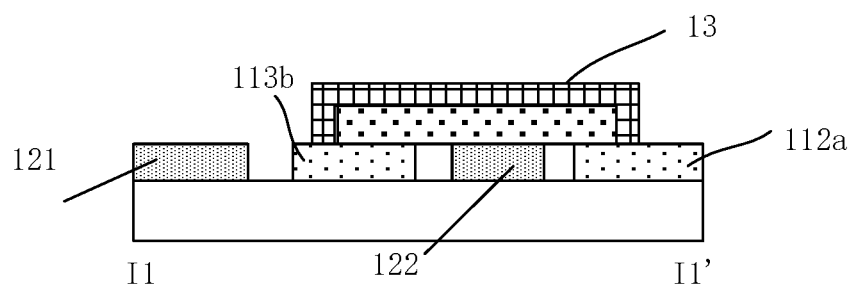
FIG. 12 is a cross-sectional view taken along line I1-I1' shown in FIG. 7.

In the present disclosure, as shown in FIG. 12, the first detection electrode group 11 and the second detection electrode group 12 are arranged in a same layer, and the second detection electrode group 12 includes a plurality of second detection electrode blocks 121 and connection portions 122. The connection portion 122 is located in a gap formed between two adjacent first detection electrode blocks. A different structure of the branching portion leads to a different gap formed between two adjacent first detection electrode blocks, which result in a different structure of the connection portion 122. In order to avoid a local large resistance of the connecting portion 122, as shown in FIG. 10, the structure of the branching portion has a pentagonal shape; or as shown in FIG. 9, the structure of the branching portion has a decagonal shape. When the structure of the branching portion shown in FIG. 7 or FIG. 11 is adopted, the gap between two adjacent first detection electrode blocks has a shape of a thin strip with a uniform width, thus the connection portion 122 also has a shape of a thin strip with a uniform width. When the width of the thin strip is small, each part of the connection portion 122 has a large resistance, thereby being non-beneficial for electrical connection between the second detection electrode blocks. When the branching structure shown in FIG. 10 or FIG. 9 is adopted, the gap between two adjacent first detection electrode blocks has a shape of a block with a non-uniform width, thus the connection portion 122 also has a shape of a block with non-uniform width. Compared with the shape of a thin strip with a uniform width, the connection portion 122 having a shape of the block with non-uniform width has fewer regions having small width, and therefore, there are fewer regions of the connection portion 122 having large local resistance.

In order to decrease the local large resistance of the connection portion, the structure of the branching portion can also have other shapes, which will not be illustrated in detail.

It should be noted that the structure of the branching portion designed by those skilled in the art under an enlightenment of the concept of the present disclosure shall fall within a protection scope of the present disclosure.

In an embodiment, the polygonal structure of the branching portion has a regular polygonal shape whose straight sides have a same length.

In an embodiment, the polygonal structure of the branching portion has a non-regular polygonal shape, one straight side of which has a different length from another straight side.

In the present disclosure, in order to makes sure that the branching portion extends from the detection electrode sub-block towards outside of the detection electrode sub-block, the structure of the main portion of the detection electrode sub-block can have various shapes.

In an embodiment, as shown in FIG. 1 to FIG. 9, the main portion has a rectangular shape.

In an embodiment, as shown in FIG. 10, f the main portion has a hexagonal shape In an embodiment, as shown in FIG. 11, the main portion has a parallelogram shape.

The structure of the main portion can also have other shapes, which will not be listed one by one herein.

It should be noted that the structure of the branching portion designed by those skilled in the art under an enlightenment of the concept of the present disclosure shall fall within a protection scope of the present disclosure.

In an embodiment, the polygonal structure of the main portion has a regular polygonal shape whose straight sides have a same length.

In an embodiment, the polygonal structure of the main portion has a non-regular polygonal shape, one straight side of which has a different length from another straight side.

In order to ensure uniformity of the distance between the bridges and decrease the process cost, in the present disclosure, the structures of the two branching portions of a same detection electrode sub-block are almost identical to each other. For example, as shown in FIG. 1 to FIG. 11, the third branching portion and the fifth branching portion of the first detection electrode sub-block are almost completely identical to each other, the first branching portion and the second branching portion of the second detection electrode sub-block are almost completely identical to each other, and the fourth branching portion and the sixth branching portion of the third detection electrode sub-block are almost completely identical to each other.

It should be noted herein that the present disclosure is not limited to the structure that the two branching portions of a same detection electrode sub-block are almost completely identical to each other, and the two branching portions of a same detection electrode sub-block can be different from each other. For example, one branching portion can extend from the end of the side of the main portion, and the other branching portion can extend from a central part of the side of the main portion, which will not be listed herein one by one in the present disclosure.

In an embodiment, the two branching portions of a same detection electrode sub-block are center-symmetric to each other about a center of the main portion of the detection electrode sub-block. In other words, one branching portion will coincides with the other branching portion after rotating 180° about the center.

In order to avoid visibility of the bridges, in an embodiment of the present disclosure, in at least one of the first direction or the second direction, the distance between two adjacent bridges is greater than or equal to 200 μm.

In order to ensure uniformity of the bridges on the entire display panel, in an embodiment of the present disclosure, the bridges are equally spaced apart from each other.

In an embodiment, the distance between two adjacent bridges is equal to the distance between two adjacent detection electrode sub-blocks. As shown in FIG. 7, in the direction D1, the distance d1 between two adjacent bridges is equal to the distance d2 between two adjacent detection electrode sub-blocks; and in the direction D2, the distance d3 between two adjacent bridges is equal to the distance d4 between two adjacent detection electrode sub-blocks. Those skilled in the art can understand that the distance between two adjacent detection electrode sub-blocks is quite large, thus a visibility issue will not occur. Therefore, when the distance between two adjacent bridges is set to the distance between two adjacent detection electrode sub-blocks, visibility of the bridges can be obviously avoided.

Considering that in the actual design, the shape of the display panel can have a shape of an irregular circle, or a special shape such as a rectangle with a hole, the setting of the touch unit may achieve perfect uniformity. Therefore, in the present disclosure, the distance between two adjacent bridges can be not be equal to the distance between another two adjacent bridges, thereby satisfying flexibility in actual designs.

In an embodiment, in order to decrease visibility of the bridges, the bridge is obliquely disposed, and an included angle between a third direction D3 along which the bridge extends and the first direction D1 is 45°.

In the present disclosure, the direction along which the bridge extends can be the first direction or the second direction, or another direction. In other words, in an embodiment of the present disclosure, an included angle formed between the third direction D3 and the first direction D1 is of a value selected from a range of [0°, 90°].

FIG. 12 is a cross-sectional view taken along line I1-I1' shown in FIG. 7. As shown in FIG. 12, the first detection electrode group 11 and the second detection electrode group 12 are arranged in a same layer, and the first detection electrode group 11 is spaced from the second detection electrode group 12 so as to achieve electrical insulation. The second detection electrode group 12 includes a plurality of second detection electrode blocks 121 and connection portions 122, and the connection portion 122 is configured to connect two adjacent second detection electrode blocks 121. As shown in FIG. 12, the bridge 13 for electrically connecting two adjacent first detection electrode blocks is arranged above the connection portion 122, that is, the bridge 13 overlaps with the connection portion 122 in a thickness direction of the display panel.

With reference to FIG. 7 and FIG. 12, in the present disclosure, a length of the bridge 13 in the third direction D3 is of a value selected from a range of [100 μm, 300 μm] comprising endpoint values. If the length of the bridge is too small, a process space for the connection portion under the bridge is small, thereby causing that the connection portion 122 of the second detection electrode group is too thin, and as a result, the resistance of the connection portion 122 increases, thereby being non-beneficial to electrical connection between the second detection electrode blocks. If the length of the bridge is too large, it is easily recognized by human eyes, thereby causing the bridges to be visible.

In an embodiment, a material of the bridge includes a metallic material, such as metallic molybdenum. If a metallic material is selected as the material of the bridge, the width of the bridge (the length of the bridge in a direction D4) is smaller than or equal to 10 When the bridge is wider, the resistance of the bridge increases, thereby being non-beneficial to electrical connection between two adjacent first detection electrode blocks.

In an embodiment, the material of the bridge includes a transparent conductive material, such as indium tin oxide ITO. If a transparent conductive material is selected as the material of the bridge, the width of the bridge (the length of the bridge in the direction D4) is smaller than or equal to 100 When the bridge is wider, the resistance of the bridge increases, thereby being non-beneficial to electrical connection between two adjacent first detection electrode blocks. It should be noted herein that, if the display panel has a small or medium size, the width of the bridge is smaller than or equal to 30 μm; and if the display panel has a large size, the width of the bridge is smaller than or equal to 100 μm. As for the display panel having a small or medium size, an internal design space thereof is very compact, thus the process space for the bridge is quite small, and therefore, taking compatibility of the actual process into account, the width of the bridge is smaller than or equal to 30 μm. As for the display panel having a large size, an internal design space thereof is relatively large, thus the process space for the bridge is relatively large.

Figure 13:
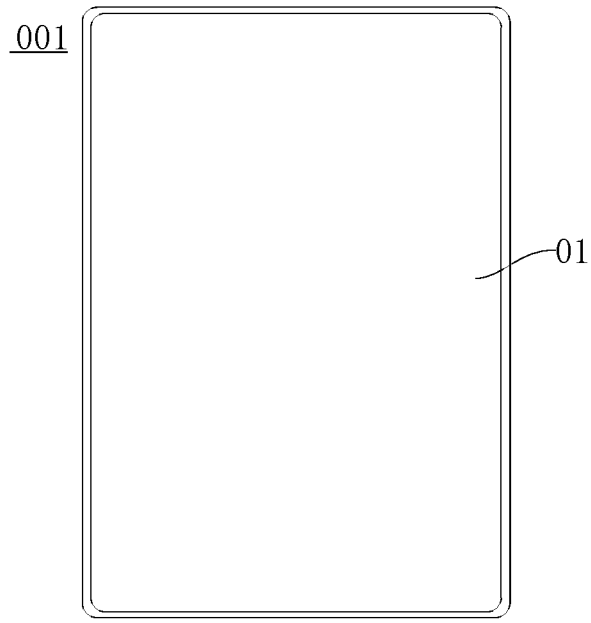
FIG. 13 is a schematic diagram of a display device according to an embodiment of the present disclosure.
Figure 14:
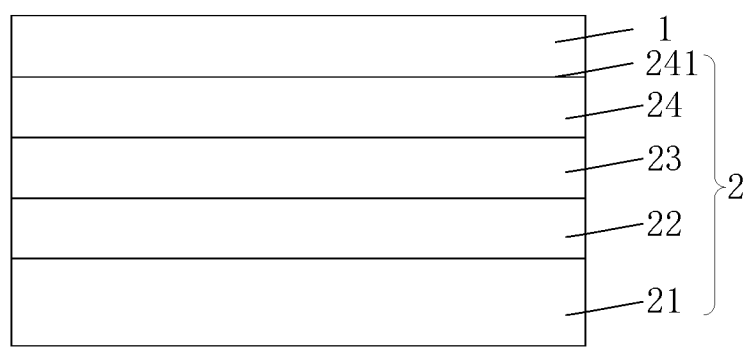
FIG. 14 is a cross-sectional view of a display panel shown in FIG. 13.

FIG. 13 is a schematic diagram of a display device according to an embodiment of the present disclosure. The display device 001 includes the display panel 01 described above. FIG. 14 is a schematic cross-sectional view of the display panel shown in FIG. 13. With Reference to FIG. 14, the display panel further includes a display module 2. The display module 2 includes a substrate 21, a driving circuit layer 22 arranged on the substrate 21, a light-emitting element layer 23 arranged on the driving circuit layer 22, and an encapsulation layer 24 arranged on the light-emitting element layer. The driving circuit layer 22 includes a plurality of thin film transistors, and the light-emitting element layer 23 includes a plurality of pixel electrodes connected to the plurality of thin film transistors. The touch unit 1 is located at a side 241 of the encapsulation layer 24 facing away from the substrate, and a structure of the touch unit 1 has been described in details in the above-mentioned embodiments, and thus will not be repeated herein. The structure of the display device shown in FIG. 14 is merely for schematic illustration. Each layer of the display module 2 can include a single layer or multi layers. Some layers can be added to the display module 2, or some of the layers of the display module 2 can be omitted. The display device shown in FIG. 13 is merely for schematic illustration, and the display device can be any electronic device with a display function, such as a mobile phone, a tablet computer, a notebook computer, an electronic paper book, or a television.

The display device provided by the embodiments of the present disclosure includes the above-mentioned display panel. Therefore, with the display device and the design for the structure of the detection electrode block, the space for the bridge increases, and the problem of dense bridges caused by the short distance between the bridges can be avoided, thereby decreasing visibility of the bridges.

It should be noted that, the number and size of the detection electrode blocks shown in the drawings of the present disclosure are merely for clarifying the inventive concept, and do not constitute a limitation to the actual number and actual size of the detection electrode blocks. A proportional relationship between the branching portion and the main portion of the detection electrode block is merely for clarifying the disclosure, and does not constitute a limitation to the actual proportional relationship between the branching portion and the main portion of the detection electrode block.

The above-described embodiments are merely exemplary embodiments of the present disclosure and are not intended to limit the present disclosure. Any modifications, equivalent substitutions and improvements made within the principle of the present disclosure shall fall into the protection scope of the present disclosure.

What is claimed is:
1. A display panel, comprising:
a touch unit,
wherein the touch unit comprises:
    a plurality of first detection electrode groups arranged along a first direction;
    a plurality of second detection electrode groups arranged along a second direction,
    wherein the first direction intersects the second direction; and
    bridges comprising a first bridge, wherein each of the plurality of first detection electrode groups comprises a first detection electrode sub-block and a second detection electrode sub-block that are adjacent to each other along the first direction, wherein the first detection electrode sub-block comprises a first main portion, and the second detection electrode sub-block comprises a second main portion and a first branching portion, wherein the first branching portion extends toward the first main portion, and the first bridge is configured to electrically connect the first branching portion and the first main portion; and wherein, in at least one of the first direction or the second direction, a distance between two adjacent ones of the bridges is greater than or equal to 200 µm.

2. The display panel according to claim 1, wherein the first detection electrode sub-block further comprises a third branching portion extending toward the second main portion; and the bridges further comprise a third bridge configured to electrically connect the third branching portion and the second main portion.

3. The display panel according to claim 1, wherein the first detection electrode group further comprises a third detection electrode sub-block, wherein the first detection electrode sub-block, the second detection electrode sub-block, and the third detection electrode sub-block are sequentially arranged along the first direction and adjacent to each other, the third detection electrode sub-block comprises a third main portion, the second detection electrode sub-block further comprises a second branching portion extending toward the third main portion; and the bridges further comprise a second bridge configured to electrically connect the second branching portion and the third main portion.

4. The display panel according to claim 3, wherein the first detection electrode sub-block has a same structure as the second detection electrode sub-block, and the third detection electrode sub-block has a same structure as the second detection electrode sub-block.

5. The display panel according to claim 1, wherein the second main portion has a side reused as a side of the first branching portion.

6. The display panel according to claim 1, wherein at a central part of a side of the second main portion, the first branching portion extends toward the first main portion.

7. The display panel according to claim 1, wherein at an end of a side of the second main portion, the first branching portion extends toward the first main portion.

8. The display panel according to claim 1, wherein the first branching portion of the second detection electrode sub-block has a polygonal shape having three or more sides.

9. The display panel according to claim 1, wherein the second main portion has a polygonal shape having four or more sides.

10. The display panel according to claim 3, wherein the second branching portion and the first branching portion have a same structure.

11. The display panel according to claim 3, wherein the second branching portion and the first branching portion are center-symmetric to each other about a center of the second main portion.

12. The display panel according to claim 1, wherein in at least one of the first direction or the second direction, a distance between two adjacent ones of the bridges is equal to a distance between two adjacent detection electrode sub-blocks of the plurality of first detection electrode groups.

13. The display panel according to claim 1, wherein each of the bridges extends along a third direction, and a first angle formed between the third direction and the first direction is of a value selected from a range of [0°, 90°].

14. The display panel according to claim 13, wherein the first angle formed between the third direction and the first direction is substantially 45°.

15. The display panel according to claim 13, wherein a length of each of the bridges in the third direction is of a value selected from a range of [100 µm, 300 µm].

16. The display panel according to claim 13, wherein a material of each of the bridges comprises a metallic material, a length of each of the bridges in a fourth direction is smaller than or equal to 10 µm, and the fourth direction intersects the third direction.

17. A display device, comprising: a display panel and a display module, wherein the display panel comprises a touch unit, wherein the touch unit comprises: a plurality of first detection electrode groups arranged along a first direction; a plurality of second detection electrode groups arranged along a second direction; and bridges comprising a first bridge, the first direction intersecting the second direction;

wherein each of the plurality of first detection electrode groups comprises a first detection electrode sub-block and a second detection electrode sub-block that are adjacent to each other along the first direction, wherein the first detection electrode sub-block comprises a first main portion, and the second detection electrode sub-block comprises a second main portion and a first branching portion, wherein the first branching portion extends toward the first main portion, and the first bridge is configured to electrically connect the first branching portion and the first main portion;

wherein, in at least one of the first direction or the second direction, a distance between two adjacent ones of the bridges is greater than or equal to 200 µm;

wherein the display module comprises:

a substrate;

a driving circuit layer arranged on the substrate and comprising a plurality of thin film transistors;

a light-emitting element layer arranged on the driving circuit layer, wherein the light-emitting element layer comprises a plurality of pixel electrodes that is connected to the plurality of thin film transistors; and an encapsulation film arranged on the light-emitting element layer; and wherein the touch unit is located at a side of the encapsulation film facing away from the substrate.

* * * * *